(No Model.)
W. D. ARNETT.
MACHINE FOR DESTROYING SAGE BRUSH AND OTHER PLANTS.
No. 459,971. Patented Sept. 22, 1891.
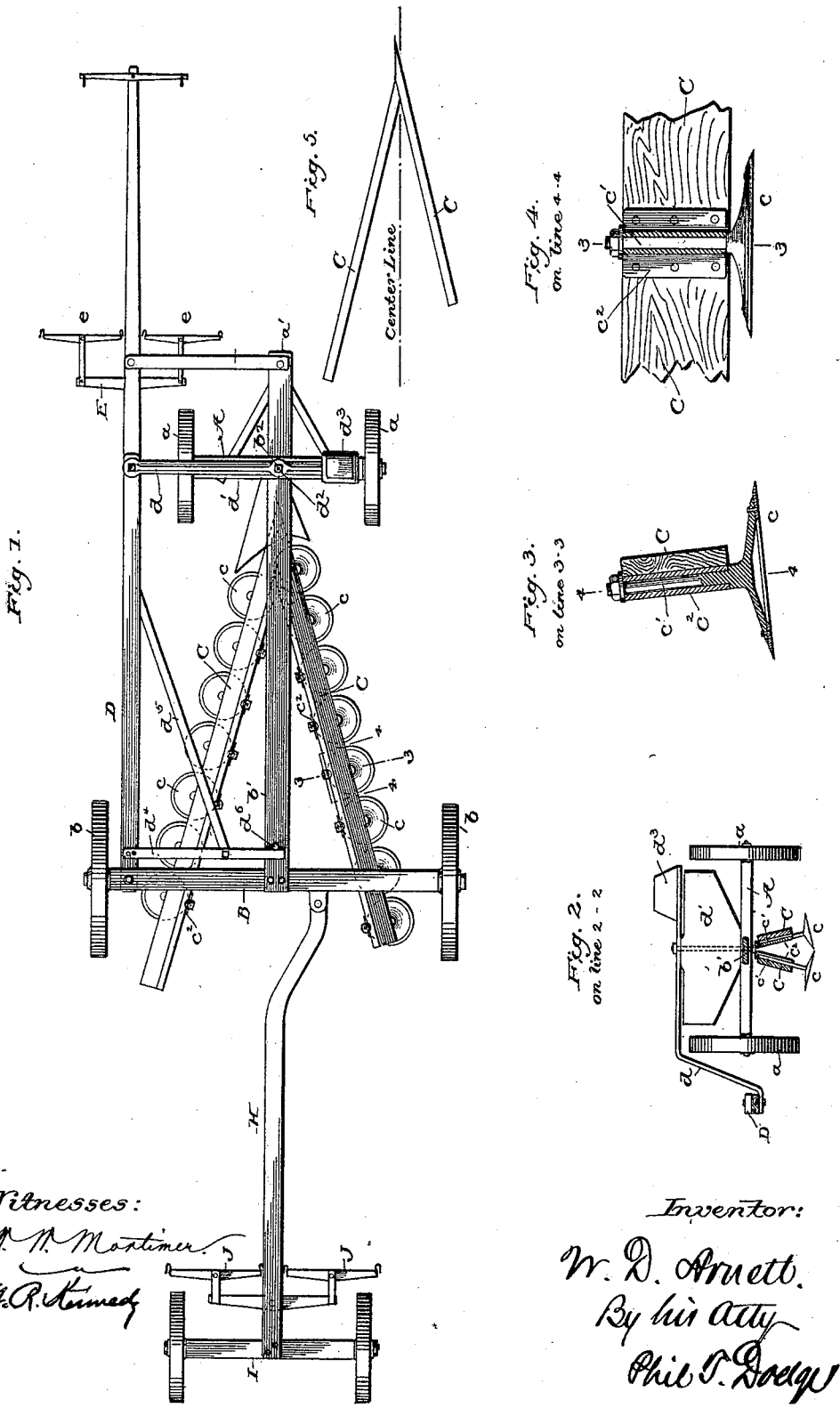

UNITED STATES PATENT OFFICE.

WILLIAM D. ARNETT, OF CALDWELL, IDAHO.

MACHINE FOR DESTROYING SAGE-BRUSH AND OTHER PLANTS.

SPECIFICATION forming part of Letters Patent No. 459,971, dated September 22, 1891.

Application filed January 23, 1891. Serial No. 378,850. (No model.)

*To all whom it may concern:*

Be it known that I, WILLIAM D. ARNETT, of Caldwell, in the county of Ada and State of Idaho, have invented an Improvement in Machines for Destroying Sage-Brush and other Plants, of which the following is a specification.

This invention relates to that class of machines represented in Letters Patent of the United States granted to me on the 3d day of December, 1889, No. 416,661, and in application for Letters Patent, Serial No. 350,102, filed April 30, 1890, in which a wheeled frame propelled by draft-animals carries near the ground an adjustable frame armed with knives or cutters to destroy the sage-brush or other objectionable growth.

The present invention has reference to improvements in the mechanism, which I now construct with a series of cutting-disks, and to improvements in the draft devices through which the propelling power is applied for advancing the machine.

In the accompanying drawings, Figure 1 is a top plan view showing in outline my improved machine, the details of the device for carrying the cutter-frame, which are foreign to the present invention, being omitted. Fig. 2 is a vertical cross-section on the line 2 2 of Fig. 1. Fig. 3 is a cross-section on the line 3 3 of Fig. 1. Fig. 4 is a cross-section on the line 4 4. Fig. 5 is a plan view showing the form in which the cutter-frame is constructed to counteract side draft.

Referring to the drawings, A represents the front main axle, sustained at its ends by two ground-wheels $a\ a$ and provided with a rigid forwardly-extending tongue $a'$, by means of which the front wheels are guided or directed in their course.

B represents a rear axle, of greater length than the front axle, sustained at its ends by ground-wheels $b\ b$ and provided at its middle with a rigid forwardly-extending rod or coupling-bar $b'$, which is connected by a vertical pivot $b^2$ to the middle of the forward axle.

C C represents the cutter-frame, of triangular form as viewed from above. It is suspended below the wheel-frame above described in any suitable manner, but preferably by suspending and adjusting devices such as described in application No. 350,102, above referred to. This frame, instead of being provided with rigid knives, as in my prior application, is now provided on each side with a series of horizontal or substantially horizontal disks $c$, arranged in line one behind the other. The two series of disks are arranged as shown in lines which converge toward the front of the machine, so that on each side each disk extends outward slightly beyond the path of the one next in advance. The disks are preferably made of cast-steel, with circular cutting-blades bolted or otherwise fixed to their outer edges, and are each sustained at the center by an upright shaft or arbor $c'$, mounted in a box or housing $c^2$, bolted to the frame, as shown in Figs. 1, 3, and 4, whereby the disk is permitted to revolve freely.

It is to be understood, however, that the disks may be modified in their details of construction and sustained by devices of any suitable character which will admit of their revolving in a horizontal or substantially horizontal plane.

I find that the best results are obtained by giving the disks a slight lateral inclination, so that they tend to act with a shearing cut in an upward direction as they are forced against the plants.

For the purpose of propelling the machine I joint or swivel loosely to the rear axle B, near one end, a draft-pole D, which is extended forward past the front axle and sustained, as shown in Figs. 1 and 2, by an arm $d$, projected laterally from a bolster $d'$, which is centrally pivoted at $d^2$ to the forward axle and provided with a weight $d^3$ to counterbalance the draft-pole. At its end the draft-pole is provided with a rigid laterally-projecting arm $d^4$, held by a brace $d^5$ or its equivalent and acting through a draft-pin $d^6$ or like connection upon the rigid bar $b'$ near the rear axle. Under this arrangement the draft-pole D acts to carry the rear axle forward in a straight line and to avoid the application of side draft to the machine.

Near its forward end the draft-pole is provided with an evener or doubletree E and singletrees $e$, through which to attach a team of draft animals. The pole is also jointed at its forward end to a cross-bar F, which is jointed in turn to the steering-tongue $a'$, so that by driving the team to the right or left the draft-pole is caused to swivel the forward axle and wheels and thus control the course of the machine. In order to permit this action the connection between the pole and the sustaining-arm $d$ should be a slotted one.

As an additional means of propelling the machine, I propose to attach to the rear axle B a push-bar H, sustained at its rear end by a wheeled axle I and provided with one or more doubletrees J, or equivalent draft devices, to permit the attachment of draft animals. This push-bar is preferably attached to the axle at a distance from its middle and on the opposite end from the draft-pole, that it may the better assist in overcoming side draft.

In operating the machine one or more teams are attached to the forward end of the draft-pole and travel at one side of the machine on the ground which was cleaned by its previous passage, while one or more additional teams are attached to the push-bar and travel immediately behind the machine in the path opened thereby. As the machine advances the outer exposed edges of the cutting-disks are carried against the plants, the disks on each side acting successively and cutting each slightly further than its predecessor. The result is the clean, rapid, and easy cutting away of the standing plants, so that a wide lane is opened through them by each passage of the machine.

The main frame and draft devices herein described may be employed with a cutter-frame of the character represented in my application and patent hereinbefore referred to.

In order to the more effectually counteract the side draft I prefer to construct the outer frame, as shown in Figs. 1 and 5, with its right side extended forward to the left of the central line and with its left side extended rearward a greater distance than the right side, so that the resistance of the plants tends to throw the front end of the frame to the left and the rear end to the right.

Having thus described my invention, what I claim is—

1. In a machine for destroying sage-brush, &c., a wheeled frame provided with a series of horizontal cutting-disks arranged in line oblique to the line of travel, whereby they are caused to act successively.

2. In a machine for destroying sage-brush, &c., a wheeled frame provided with two series of horizontal cutting-disks arranged in lines converging in a forward direction, and with a pointed frame immediately in advance of the disks.

3. The main frame having the four wheels and the swiveling front axle, in combination with a cutter-frame carried thereby, the draft-pole located at one side and having the side extension at the rear, and the connection between the forward end of the draft-bar and the front axle, whereby the pole is enabled to push the frame at the rear and steer it at the front.

4. The wheeled frame having the cutter-frame attached, in combination with the draft-bar located and attached at one side, as shown, and the push-bar connected to the rear axle and provided with sustaining-wheels and draft devices, substantially as shown.

5. The wheeled frame having the cutter-frame attached, in combination with the draft-bar jointed to one end of the rear axle and provided with the lateral arm to act at or near the middle of the axle, the bolster and its arm to sustain the forward end of the draft-bar, and the rear push-bar attached to the rear axle on the opposite end from the draft-bar.

6. In a machine for destroying sage-brush, &c., having draft connections at one side, the triangular cutter-frame having one side extended laterally beyond the other at the front end, substantially as described and shown, to counteract the side draft.

7. In a machine for destroying sage-brush, &c., having draft connections at one side, the triangular cutter-frame having one side extended rearward beyond the other to assist in counteracting the side draft.

In testimony whereof I hereunto set my hand, this 8th day of November, 1890, in the presence of two attesting witnesses.

WILLIAM D. ARNETT.

Witnesses:
SILAS L. MORROW,
ALBERT L. BUTTS.